J. S. DICKEY.
WASHING MACHINE.
APPLICATION FILED DEC. 27, 1911.
1,028,003.
Patented May 28, 1912.
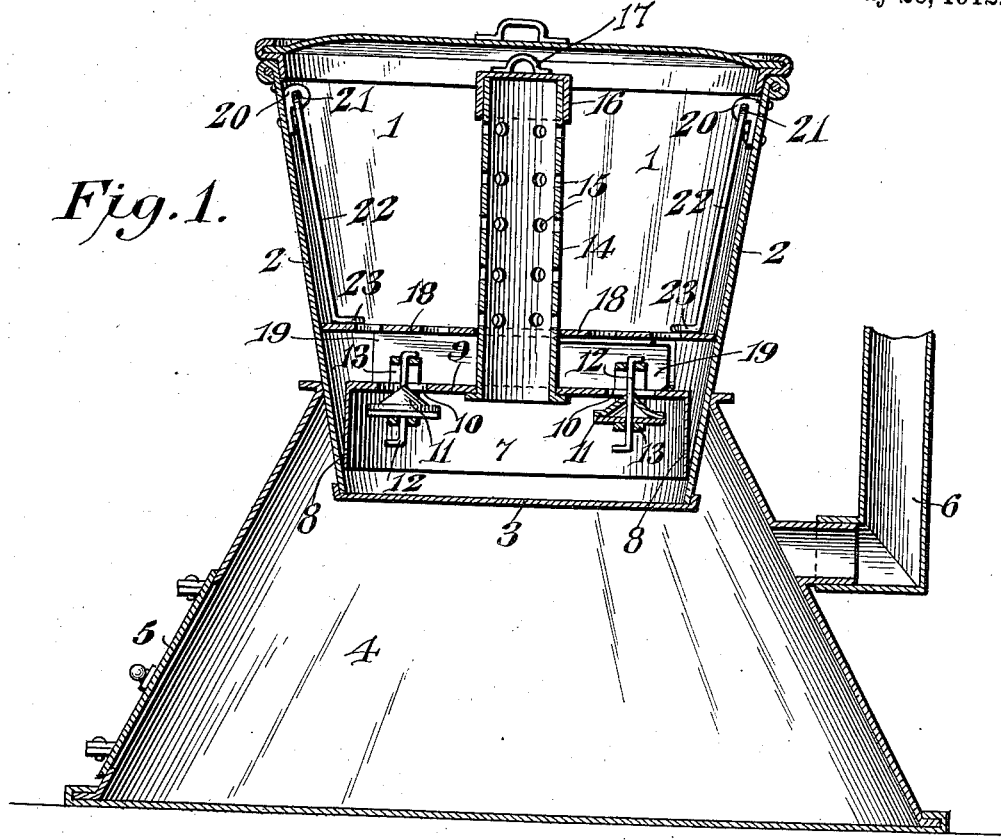
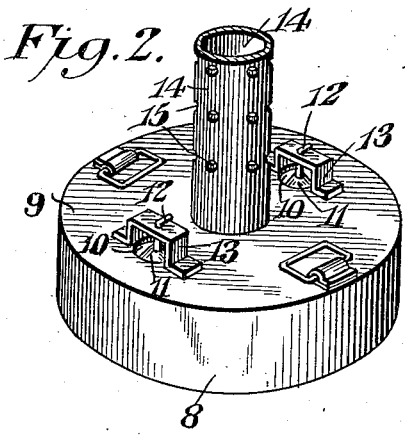
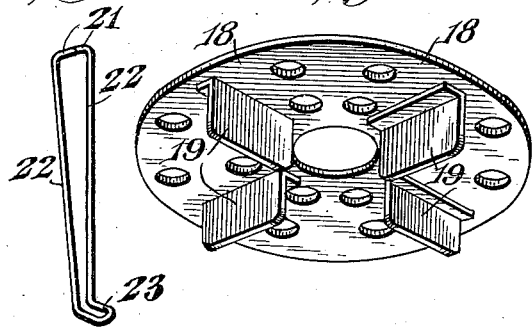
John S. Dickey, Inventor
Witnesses

UNITED STATES PATENT OFFICE.

JOHN S. DICKEY, OF COLLINSVILLE, TEXAS.

WASHING-MACHINE.

1,028,003.  Specification of Letters Patent.  Patented May 28, 1912.

Application filed December 27, 1911. Serial No. 668,164.

*To all whom it may concern:*

Be it known that I, JOHN S. DICKEY, a citizen of the United States, residing at Collinsville, in the county of Grayson and State of Texas, have invented a new and useful Washing-Machine, of which the following is a specification.

The present invention relates to clothes washers of the type wherein mechanical contrivances are omitted and the washing action obtained from jets of hot water and steam passing through and in intimate contact with the clothes.

The invention has for its object the provision of means for confining within a limited space boiling water and directing in the most efficient manner water and resultant steam in jets upon clothing contained within the inner receptacle and causing the water to traverse the clothing and escape at a point removed from its entrance.

The invention as thus outlined and as particularly pointed out in the appended claims will be described in detail in connection with the accompanying illustrative drawing; it being understood that various changes in the form and proportion of parts and minor details of construction may be made within the scope of the invention as claimed, without departing from or materially sacrificing its advantages.

In the drawing:—Figure 1 is a vertical section through the device in operative position upon a stove. Fig. 2 is a perspective view of the inner vessel. Fig. 3 is a perspective view from below of the diaphragm upon which the clothes rest. Fig. 4 is a detail of the clamping device.

The washer proper comprises the outer vessel 1, which may be made of any suitable substance, such as sheet metal, having imperforate walls 2 downwardly converging to an imperforate bottom 3. This vessel is adapted to be set upon the top of any ordinary stove, although I have illustrated the same in connection with a conventional showing of a laundry furnace 4 having a fire door 5 and a flue 6. Within this outer vessel is disposed an inner vessel 7 having cylindrical walls 8 open below and having a top 9 imperforate except for openings 10 within which are seated upwardly coned valves 11, having the valve stems 12 slidably mounted in brackets 13 for movement axially of the said openings 10. The top 9 of the inner vessel 7 also has a central opening within which is secured the lower end of the vertical tube 14, having its walls provided with a plurality of spaced openings 15 and its top closed by a cap 16 bearing a lift 17. The walls 8 of the vessel 7 are sufficiently thin to be resilient and the outer diameter of the vessel 7 is slightly greater than the interior diameter of the vessel 1 at its bottom, so that the vessel 7 is supported within the vessel 1 by a wedging action of its yielding walls against the walls of the outer vessel and at a slight distance from the bottom of the outer vessel, as shown in Fig. 1.

Within the outer vessel and about the central tube 14 is arranged a foraminous diaphragm 18, resting upon the inner vessel 7 and spaced therefrom by the radially arranged legs or flanges 19. The side walls of the vessel 1 are provided on the inner side with ears 20, arranged diametrically opposite each other and adapted to be engaged by the off-set portions 21 of a clamping member 22, the lower portion of said member being off-set, as shown at 23 in Fig. 4, and the two clamping members being arranged to be swung downwardly and outwardly in engagement with the diaphragm 18 in order to force the said diaphragm and the inner vessel 7 downwardly and there maintain the same to prevent the upward shifting of the said parts and to effect a sealing by the walls 8 of the space beneath the vessel 7.

In use the outer vessel is filled with soapy water to a point below the diaphragm 18, the inner vessel and diaphragm are then placed in the said outer vessel and secured in the position shown in Fig. 1 by the clamping members 22. The soiled clothes are then placed in the vessel above the diaphragm and around the vertical tube 14. The vessel being placed upon the stove, steam is speedily generated in the space below the vessel 7 and, by the pressure of the boiling water and steam, the check valves 11 are seated, the conical upper face contributing to the centering of the valve and an exact seating of the same. These valves having been closed, the pressure of confined steam forces a mixture of boiling water and steam upwardly through the tube 14 and radially therefrom through the openings 15, the boiling water finding its way through the clothes downwardly by gravity to the space between the diaphragm and the top 9 of the inner vessel. When the weight of the water accumulated above the inner vessel 7 is sufficient to overcome the pressure of the steam below the same, the check valves 11 will drop to the position shown in Fig. 1, allowing the water to return through the annular passage about the valves. The pressure from above due to the weight of the water having been relieved, the valve again closes and the mixture of water and steam as before is discharged into and passed through the clothing, this operation being repeated intermittently until such time as the clothes are entirely clean.

An important feature of this invention is the downwardly converging relation between the adjacent walls of the inner and outer vessels, and the resilient nature of the walls of the inner vessel, whereby a wedging co-action between the two walls is obtained and whereby the pressure of steam and water within the confined space operates to press the walls 8 outwardly into intimate contact with the walls 2.

Other important features of the invention are the specific construction and arrangement of the clamping devices, whereby the parts are pressed downwardly and also securely held in such clamped position, and also the arrangement of the foraminous diaphragm spaced above and coöperating with the upwardly coned downwardly opening check valves and the perforate tube, whereby a very simple and efficient construction is obtained.

The outer vessel may advantageously be provided with a cover to confine the steam therein, although such is not absolutely necessary.

What is claimed is:—

In a washer, the combination of an outer vessel open above and closed below, an inner vessel closed above and open below, the contiguous walls of the inner and outer vessels arranged at a downwardly converging inclination and of a relative size to support the inner vessel above the bottom of the outer vessel by a wedging co-action of the walls, a tube communicating axially with the interior of the inner vessel and rising above the same within the space inclosed by the outer walls, said tube having a closed upper end and perforate walls, the top of the inner vessel provided with openings, downwardly opening check valves arranged in said openings, a foraminous diaphragm disposed within the outer vessel in spaced relation to and above the top of the inner vessel, and links coupled to the outer walls of the outer vessel and bearing down upon the top of the inner vessel to force the same downward with its walls in wedged relation to the outer vessel.

In testimony, that I claim the foregoing as my own, I have hereto affixed my signature in the presence of two witnesses.

JNO. S. DICKEY.

Witnesses:
E. B. Hendricks,
E. S. Baker.

Copies of this patent may be obtained for five cents each, by addressing the "Commissioner of Patents, Washington, D. C."